(12) United States Patent
Wehrmann (10) Patent No.: US 11,604,090 B2
(45) Date of Patent: Mar. 14, 2023

(54) BELT CONVEYOR SCALE INCLUDING A BELT CONVEYOR AS WELL AS BELT CONVEYOR FRAME

(71) Applicant: Bizerba SE & Co. KG, Balingen (DE)

(72) Inventor: Johann Wehrmann, Balingen (DE)

(73) Assignee: BIZERBA SE & CO. KG, Balingen (DE)

( * ) Notice: Subject to any disclaimer, the term of this patent is extended or adjusted under 35 U.S.C. 154(b) by 0 days.

(21) Appl. No.: 17/497,985

(22) Filed: Oct. 11, 2021

(65) Prior Publication Data

US 2022/0120603 A1 Apr. 21, 2022

(30) Foreign Application Priority Data

Oct. 16, 2020 (EP) ..................... 20202423

(51) Int. Cl.
*B65G 15/60* (2006.01)
*B65G 39/12* (2006.01)
*G01G 11/00* (2006.01)

(52) U.S. Cl.
CPC ............. *G01G 11/00* (2013.01); *B65G 15/60* (2013.01); *B65G 39/12* (2013.01)

(58) Field of Classification Search
None
See application file for complete search history.

(56) References Cited

U.S. PATENT DOCUMENTS

| 4,134,465 A | * | 1/1979 | Takahama | ............... | G01G 11/18 177/16 |
| 11,192,723 B2 | * | 12/2021 | DeGroot | ................ | B65G 45/16 |

FOREIGN PATENT DOCUMENTS

| CN | 1915771 B | 10/2010 |
| CN | 203624355 U | 6/2014 |
| DE | 102007032270 A1 | 1/2009 |
| EP | 0592349 A1 | 4/1994 |
| EP | 1427999 B1 | 11/2006 |

* cited by examiner

*Primary Examiner* — Kavel Singh
(74) *Attorney, Agent, or Firm* — Leydig, Voit & Mayer, Ltd.

(57) ABSTRACT

A belt conveyor conveys discrete articles. The belt conveyor includes: a conveyor frame having a top side, a bottom side, and a length extending in the conveying direction for the discrete articles; a conveying belt configured to revolve around the conveyor frame during operation of the belt conveyor; and a belt-guide mounted to the bottom side of the conveyor frame between the conveyor frame and the conveying belt. The belt-guide includes at least two rolling-element bearings. The inner races of the rolling-element bearings are respectively mounted on axles. The axles are parallel to each other and stationary relative to the conveyor frame. The outer races of the rolling-element bearings have direct contact with the conveying belt.

18 Claims, 5 Drawing Sheets

BELT CONVEYOR SCALE INCLUDING A BELT CONVEYOR AS WELL AS BELT CONVEYOR FRAME

CROSS REFERENCE TO RELATED APPLICATIONS

This application claims benefit to European Patent Application No. 20 202 423.8 filed on Oct. 16, 2020, which is hereby incorporated by reference herein.

FIELD

The present invention relates to a belt conveyor for conveying discrete articles, especially for a belt conveyor scale for conveying and weighing discrete articles, in particular articles to be weighed, the belt conveyor including a belt conveyor frame having a top side, a bottom side, and a length extending in the conveying direction of the discrete articles, and further including a conveying belt revolving around the conveyor frame during operation of the belt conveyor.

BACKGROUND

EP1427999B1 shows a belt conveyor for a belt conveyor scale for weighing individual food items. There is proposed a mechanism by which the tension of a conveying belt of the belt conveyor is maintained optimal.

EP0592349A1 shows a belt conveyor for a belt conveyor scale for weighing individual items. The tension of a conveying belt is maintained by a pivotable roller.

SUMMARY

In an embodiment, the present disclosure provides a belt conveyor that conveys discrete articles. The belt conveyor includes: a conveyor frame having a top side, a bottom side, and a length extending in the conveying direction for the discrete articles; a conveying belt configured to revolve around the conveyor frame during operation of the belt conveyor; and a belt-guide mounted to the bottom side of the conveyor frame between the conveyor frame and the conveying belt. The belt-guide includes at least two rolling-element bearings. The inner races of the rolling-element bearings are respectively mounted on axles. The axles are parallel to each other and stationary relative to the conveyor frame. The outer races of the rolling-element bearings have direct contact with the conveying belt.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

In an embodiment, the present invention provides a belt conveyor of the type mentioned at the outset, which allows optimum running smoothness of the conveying belt at high speeds and, when used in conjunction with a belt conveyor scale, permits highly accurate weight determination.

In accordance with an embodiment of the present invention, there is provided a belt conveyor for conveying discrete articles. The belt conveyor is in particular a belt conveyor scale. The belt conveyor includes a conveyor frame having a top side, a bottom side, and a length extending in the conveying direction of the discrete articles. The belt conveyor further includes a conveying belt revolving around the conveyor frame during operation of the belt conveyor. A belt-guiding device is mounted to the bottom side of the conveyor frame between the conveyor frame and the conveying belt. The belt-guiding device includes at least two rolling-element bearings. The inner races of the rolling-element bearings are each mounted on an axle.

In one embodiment, the axles for the rolling-element bearings take the form of a common axle.

In one embodiment, at least two rolling-element bearings are mounted on separate axles; i.e., the inner races of the rolling-element bearings are each mounted on a separate axle. The axles are disposed parallel to each other and stationary relative to the conveyor frame. In this context, "stationary" should not be understood to mean that the axles are not rotatable. Rather, the position of the axles is defined relative to the conveyor frame. The outer races of the rolling-element bearings have direct contact with the conveying belt. In other words, the belt conveyor includes a belt-guiding device having rolling-element bearings, the rolling-element bearings being provided for guiding the belt. The conveying belt runs over a front conveyor roller and a rear conveyor roller. The conveying belt is supported or tensioned by the rolling-element bearings along the path between the front and rear conveyor rollers. Rolling-element bearings have the advantage that they do not require alignment or balancing. The inner and outer races of a rolling-element bearing are exactly aligned with each other. By mounting the rolling-element bearings on the belt-guiding device, a more trouble-free running of the conveying belt is achieved as compared to a belt-guiding device that tensions the conveying belt with a conveyor roller. A conveyor roller used for tensioning the conveying belt would have to be aligned. Any tolerance in the alignment of the conveyor roller would have an immediate negative effect on the running smoothness of the conveying belt and thus on the accuracy of the weight determination. Also, the conveying belt does not run smoothly over a belt-guiding device which consists only of a deflector plate. In addition, the conveying belt would drag over the deflector plate and wear out faster. The rolling-element bearings for supporting the conveying belt offer a surprisingly simple and effective way to avoid the disadvantages of a conveyor roller or a deflector plate. The roller bearings are very narrow compared to the width of the conveying belt and support the conveying belt only at certain points. Because the conveying belt is supported only at certain points in a direction transverse to the conveying direction by the outer races of the rolling-element bearings, and because the axles of the rolling-element bearings are aligned parallel with each other, there is no need to manually align the belt-guiding device. In addition, in comparison to a conveyor roller, the rolling-element bearings do not have to be balanced in a separate step during assembly. Since the outer races of rolling-element bearings are hardened, the conveying belt can run directly over the outer races of the rolling-element bearings without wearing the rolling-element bearings.

In an embodiment, the belt-guiding device is formed by a cross member. The cross member is mounted, in particular at least substantially centrally, to the bottom side of the conveyor frame. The cross member extends transversely, in particular perpendicularly, to the conveying direction over a substantial portion of the width of the conveyor frame. The cross member serves to hold the rolling-element bearings that guide the conveying belt through direct contact with the conveying belt. The rolling-element bearings support the conveying belt at a plurality of points distributed over the width of the conveying belt. In most cases, the width of the conveying belt is equal to or slightly less than the width of the conveyor frame. Therefore, the belt-guiding device, whose cross member holds the rolling-element bearings, has a width equal to or only slightly less than the width of the conveying belt. Consequently, the cross member extends over a substantial portion of the width of the conveyor frame. In an embodiment, the cross member extends over at least 80% of the width of the conveyor frame.

In an embodiment, the rolling-element bearings are mounted with retaining elements on the cross member of the belt-guiding device.

In an embodiment, the cross member includes folds in regions which are intended to receive rolling-element bearings. The folds extend along the length of the cross member. This indicates the direction of the folds. It should be appreciated that this does not necessarily mean that the folds extend over the entire width of the cross member. As a result of the folds, an angled portion is formed in the cross member. A V-shape is created. This V-shape can be easily produced by the folds and, together with the retaining elements, provides automatic alignment of the axles, and thus of the rolling-element bearings relative to the conveying belt.

In an embodiment, the cross member includes a continuous fold extending over the entire length of the cross member. In this way, a V-shape is created to form regions which are intended to receive rolling-element bearings. This has the advantage that all rolling-element bearings have the same height since the axles of the rolling-element bearings rest in and against the V-shape formed by the fold. In the case of axles and rolling-element bearings of the same type, the outer surfaces of the outer races of the rolling-element bearings are at the same height and thus afford optimal guidance for the conveying belt.

In an embodiment, the axles on which the inner races of the rolling-element bearings are mounted are held by retaining elements in a V-shape of the cross member, which V-shape is formed by the folds. This means that the axles are held stationary between the cross member and the retaining elements by means of the V-shaped cross member and the retaining elements. However, it is irrelevant whether the axles are able to rotate about their own axes, or whether the axles are clamped between the retaining elements and the cross member in such a manner that they no longer rotate. The interaction between the folds in the cross member and the retaining elements causes the axles to align perpendicular to the conveying direction during assembly. There is no need for a separate alignment step.

In an embodiment, the retaining elements each include two stops which limit the position of an axle in its axial direction. Thus, the axles cannot slide out of the space between the cross member and the retaining elements in the axial direction.

In an embodiment, the cross member has the shape of a channel. A V-shape is formed centrally along the axis of the channel. This V-shape is formed by the folds of the cross member. The internal angle of the V-shape is an obtuse angle, in particular an angle between 135° and 170°, in particular between 150° and 170°.

In an embodiment, the lateral ends of the channel-shaped cross member have further folds and mounting holes. The cross member is screwed to the conveyor frame at the mounting holes. In an embodiment, the lateral ends of the channel-shaped cross member have folded edges by which the cross member is riveted to the conveyor frame. These folded edges extend along the axis of the cross member. The lateral ends refer to the lateral boundaries of the channel-shaped cross member, and not to the axial ends of the channel-shaped cross member.

In an embodiment, the rolling-element bearings are ball bearings or roller bearings. Ball bearings or roller bearings are readily available inexpensive standard components, whose inner and outer races are aligned with one another. Therefore, there is no need to separately align the guides for the conveying belt, which are formed by the outer races of the ball or roller bearings.

In an embodiment, the cross member is formed of a folded metal plate. The axles on which the rolling-element bearings are mounted are mounted on the cross member on the side facing the conveyor frame. The cross member includes openings through which the rolling-element bearings extend partially through the cross member. The conveying belt at least partially contacts the portion of the rolling-element bearings that extends through the opening of the cross member. The conveying belt is supported at certain points by the rolling-element bearings and runs over a portion of the surface of the outer races of the rolling-element bearings. Due to the revolving movement of the conveying belt, and because of the contact of the outer races of the rolling-element bearings with the conveying belt, the rolling-element bearings rotate at a speed proportional to the conveying belt.

In an embodiment, each retaining element is formed of a V-shaped metal plate. The metal plate is folded at its ends. The metal plate has an opening through which the rolling-element bearings partially extend. In an embodiment, the retaining elements are connected, in particular screwed or riveted, to the cross member. The extension of the V-shape of the cross member in the region where a rolling-element bearing is mounted with a retaining element on the cross member is parallel to the extension of the folded ends of a retaining element. This allows the retaining element to be screwed or riveted to the cross member. The openings for the rolling-element bearings in the cross member and the openings for the rolling-element bearings in the retaining elements are aligned with one another. This means that when the retaining elements are connected to the cross member, the openings are located above one another. Formed between the cross member and the retaining elements are cavities which form receptacles for the axles on which the rolling-element bearings are mounted.

In an embodiment, guide nubs are disposed at the height of the inner race of the rolling-element bearing and protrude from both sides into the opening of the retaining element. In this way, the rolling-element bearing is laterally supported by the guide nubs. If the inner race of the rolling-element bearing is merely slipped onto the axle without forming a fixed connection, then the rolling-element bearing is held in its axial position by means of the guide nubs. The axle is movable in the axial direction to the extent allowed by the stops. This eliminates the need for a fixed connection between the axle and the rolling-element bearing, which significantly simplifies manufacture.

An embodiment of the present invention also relates to a belt conveyor scale, including a scale unit having at least one load cell, and further including a belt conveyor as described above, which is placed on the scale unit.

Figure 1:
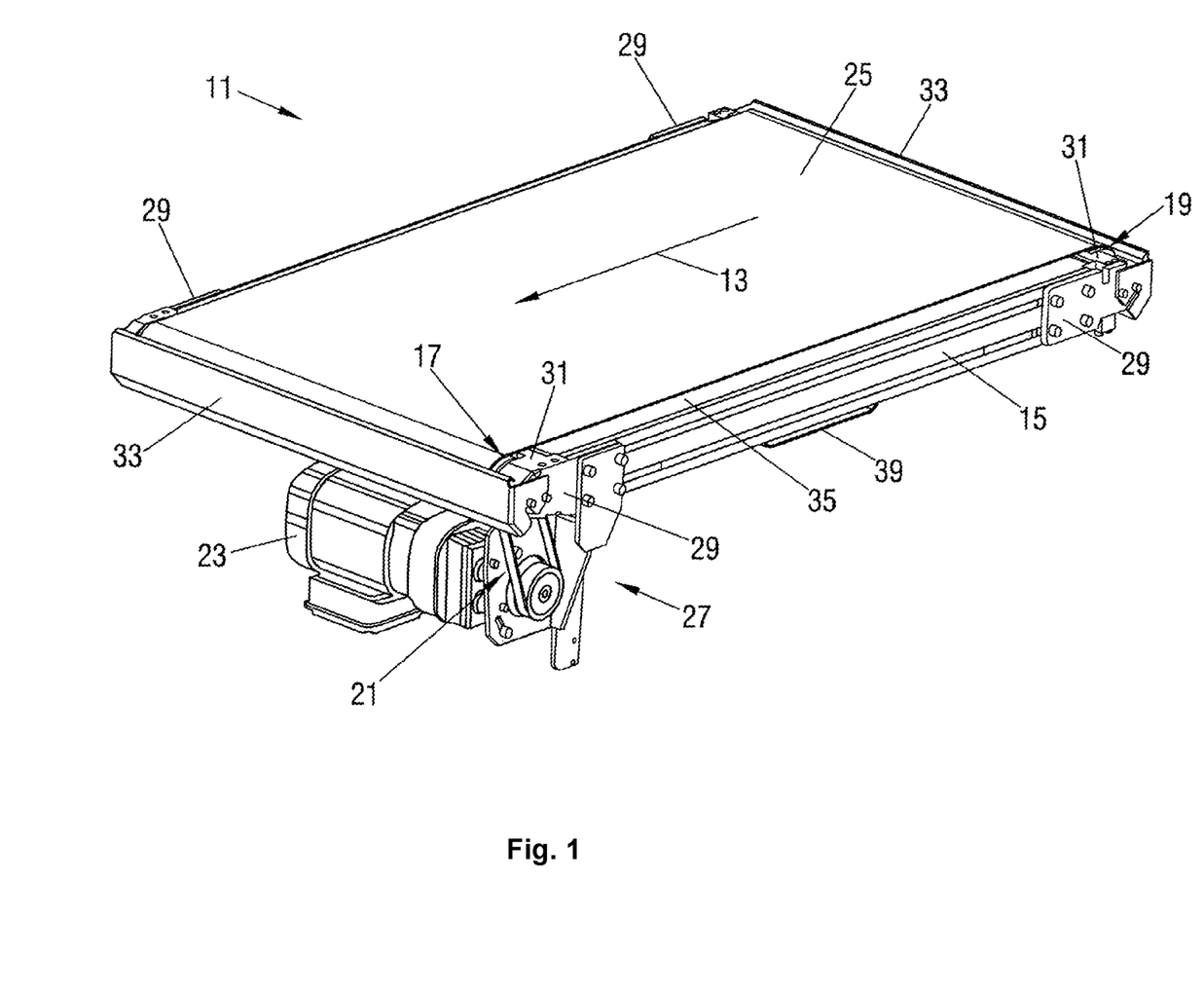
FIG. 1 is a perspective view of an inventive belt conveyor having a conveyor frame and a conveying belt.

The belt conveyor shown in FIG. 1 is part of a belt conveyor scale, for example of a checkweigher or a weigh price labeler, which is placed on a scale unit of the belt conveyor scale, the scale unit having at least one load cell, in particular up to four load cells. Thus, the belt conveyor shown is a weighing conveyor 11.

Weighing conveyor 11 is typically interposed between an infeed belt and a discharge belt, which in an exemplary embodiment may also have the inventive features of weighing conveyor 11. Weighing conveyor 11, in particular in conjunction with the infeed belt and the discharge belt, allows discrete articles or articles to be weighed to be conveyed over the scale unit in order to determine the weight of the particular discrete article. The weight determination generally takes place while the particular discrete article is conveyed onward. However, the conveying operation may, in principle, also be stopped to perform the weight determination.

Weighing conveyor 11, which conveys the discrete articles in a conveying direction 13, includes a conveyor frame 15, in particular of aluminum, which is configured between a first conveyor roller 17 designed as a drive roller and second conveyor roller 19 designed as an idler roller. In FIG. 1, first conveyor roller 17 and second conveyor roller 19 are largely hidden from view by other components of weighing conveyor 11, which will be described below in more detail. Each of the two conveyor rollers 17, 19 is rotatably mounted in two supports 29, which project from conveyor frame 15 in conveying direction 13 or in a direction opposite to conveying direction 13 at both sides of conveyor frame 15. First conveyor roller 17 is driven via a belt transmission 21 by an electric motor 23, which is fixedly mounted to conveyor frame 15 via a holding device 27.

Furthermore, weighing conveyor 11 includes a conveying belt 25 which is configured as an endless belt and revolves around conveyor frame 15 and the two conveyor rollers 17, 19 during operation of weighing conveyor 11. Weighing conveyor 11 further includes four cover plates 31 disposed to the left and right of the two conveyor rollers 17, 19. For the sake of simplicity, only the two cover plates 31 shown at the front in FIG. 1 are provided with a reference numeral. In addition, a protective strip 33 is provided for conveying belt 25 at each of the receiving and discharge ends. Via the protective strips, weighing conveyor 11, an infeed belt that is similarly designed at least at the discharge end, and a discharge belt that is similarly designed at least at the receiving end can be arranged end to end in abutting relationship.

To determine the weight of the discrete articles conveyed over the scale unit as accurately as possible, the upper run of conveying belt 25 may lie on or slide over a substantially even surface. To achieve this, weighing conveyor 11 has a top panel 35, in particular of metal, which is disposed between the top side of conveyor frame 15 and the upper run of conveying belt 25 so that the upper run of conveying belt 25 lies on top panel 35. Top panel 35 extends in conveying direction 13 over the entire length of conveyor frame 15 and projects from below the upper run of conveying belt 25 on both sides.

Furthermore, a belt-guiding device is mounted at least substantially centrally to the bottom side of conveyor frame 15, the belt-guiding device having a cross member 39 which extends transversely, in particular perpendicularly, to conveying direction 13 over a substantial portion or the entire width of conveyor frame 15. The belt-guiding device ensures smooth running of the lower run of conveying belt 25.

Figure 2:
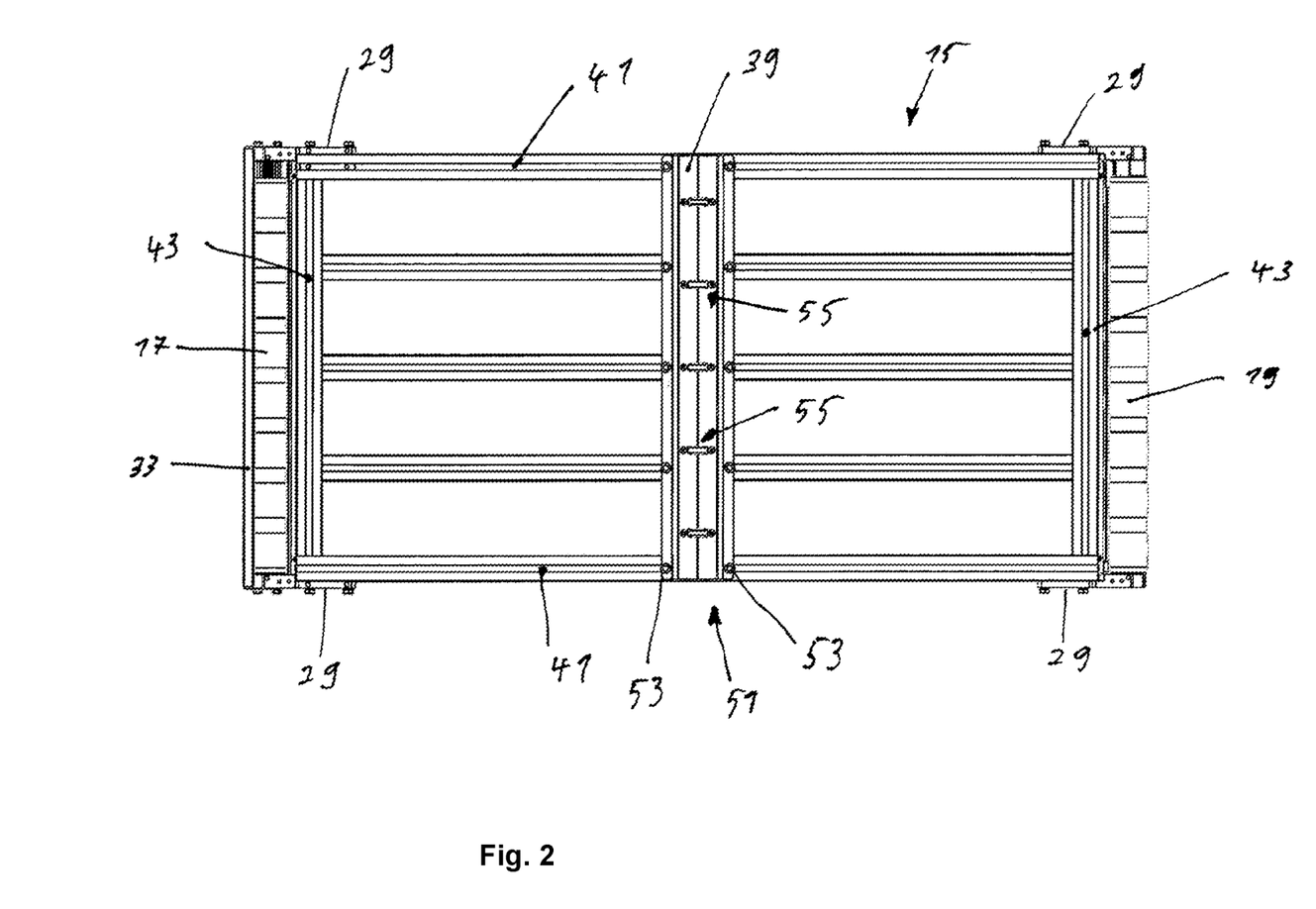
FIG. 2 is a bottom view showing an inventive belt conveyor with a conveyor frame, but without a conveying belt.

FIG. 2 shows an inventive weighing belt 11 in a view from below. Conveyor frame 15 is composed of an arrangement of a plurality of profile members 41, 43. In the example shown, the arrangement of profile members includes five profile members 41 extending in the conveying direction 13 of the discrete articles and two profile members 43 extending transversely to the conveying direction 13 of the discrete articles. Profile members 41, 43 are extruded profiles, in particular of aluminum. Conveyor frame 15 forms the supporting structure of the belt conveyor, in particular of the weighing conveyor 11 of an in-motion scale system, and holds further components of weighing conveyor 11, in particular conveyor rollers 17, 19, which are attached to conveyor frame 15 by means of supports 29. A belt-guiding device 51 is composed of a cross member 39 which extends transversely, in particular perpendicularly, to conveying direction 13 and is mounted with screws 53 at least substantially centrally to the bottom side of conveyor frame 15. Belt-guiding device 51 includes rolling-element bearings 55 which are mounted on cross member 39 on the side facing the conveyor frame 15 and extend at least partially through cross member 39 toward the lower run of the conveying belt.

Figure 3:
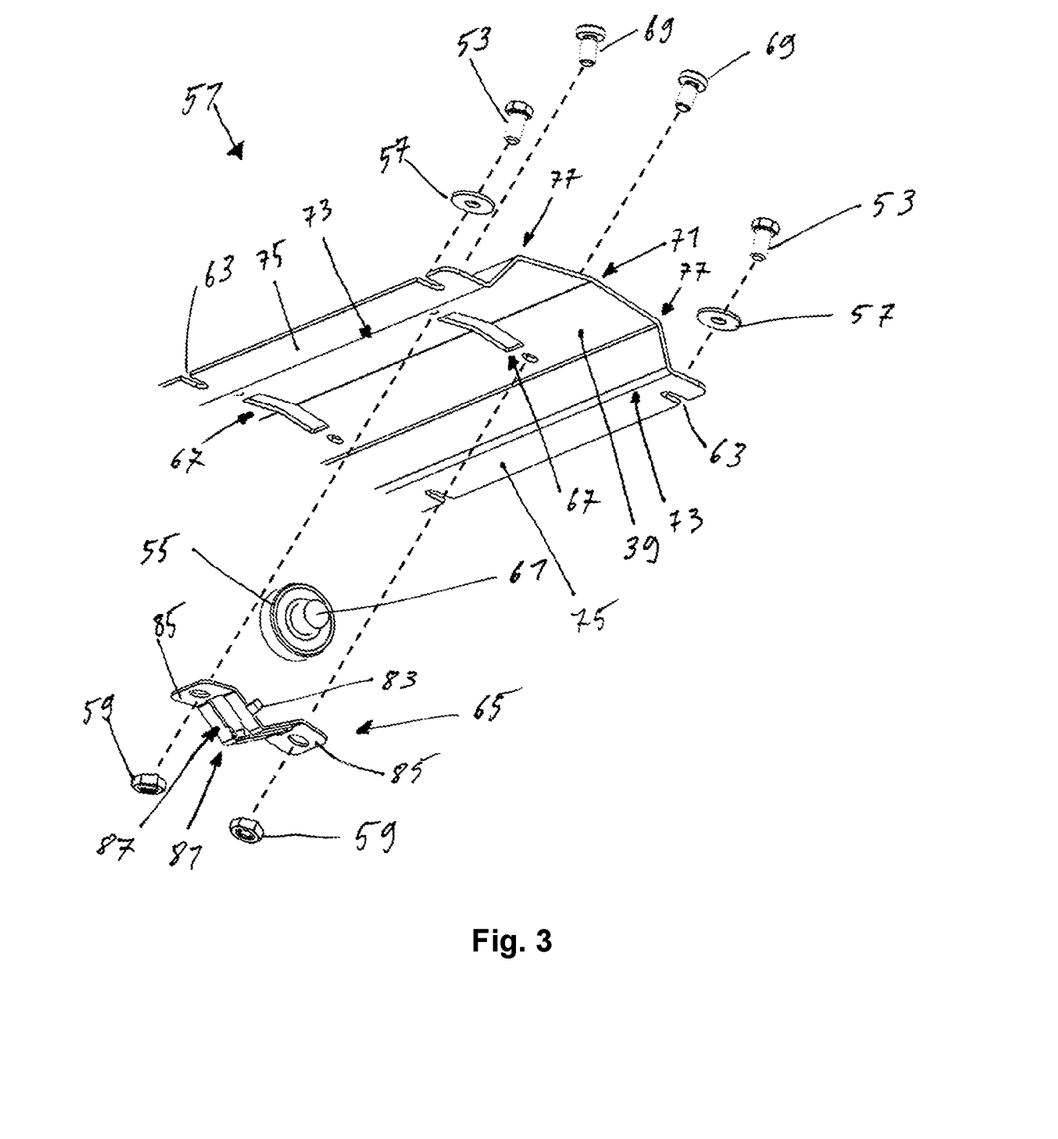
FIG. 3 is an exploded view showing a portion of the belt-guiding device.

FIG. 3 shows an exploded view of belt-guiding device 51. Cross member 39 is shown partially. Cross member 39 is formed by a metal plate that is folded so that an angled portion in the form of a V is obtained centrally along the longitudinal axis of the cross member by a central fold 71. The internal angle of the V-shape is an obtuse angle, in particular an angle between 135° and 170°, in particular between 150° and 170°. By means of a further fold 77 on either side of the angled portion, cross member 39 forms the shape of a channel.

Two mounting rails 75 are formed at the outer sides of cross member 39 by a respective further fold 73. Mounting rails 75 are formed horizontally and include mounting holes 63 through which cross member 39 is attached with screws 53 and washers 57 to conveyor frame 15, in particular to the profile members 41 disposed parallel to conveying direction 13.

Openings 67 are formed along the longitudinal direction of cross member 39 in the region of the angled portion formed by central fold 71. Openings 67 have a rectangular elongated shape whose long side is oriented along conveying direction 13. Rolling-element bearings 55 extend partially through cross member 39 through openings 67. In particular, a plurality of openings 67 are provided for a plurality of rolling-element bearings 55 and are in particular arranged at regular intervals along the longitudinal direction of cross member 39.

Rolling-element bearings 55 are commercial rolling-element bearings, in particular ball bearings or roller bearings having an inner race and an outer race. The inner and outer races are movable relative to each other by a bearing arrangement; i.e., they are arranged so as to be rotatable relative to each other. The inner race of the rolling-element bearings is mounted on an axle 61. Rolling-element bearing 55, together with the axle, is mounted on the inner side of cross member 39; i.e., within the channel of cross member 39. This is the side facing the conveyor frame 15.

Axle 61 is oriented along the angled portion formed by central fold 71 and is supported in its radial direction in this angled portion. The rolling-element bearing and axle 61 are fixed in place by means of a retaining element 65. Retaining element 65 is mounted with screws 69 and nuts 59 in the region of opening 67 on the side of cross member 39 that faces conveyor frame 15. Retaining element 85 is formed by a V-shaped metal plate. The V-shape is created by a central fold 81. The ends of the metal plate are folded, forming mounting tabs 85 which extend parallel to the V-shape of cross member 39. Retaining element 65 is mounted via mounting tabs 85 to cross member 39 using screws 69 and nuts 59. Retaining element 65 includes an opening 87 through which rolling-element bearing 55 partially extends. Retaining element 65 includes on either side a stop 83, the stops limiting axial displacement of axle 61.

Figure 4:
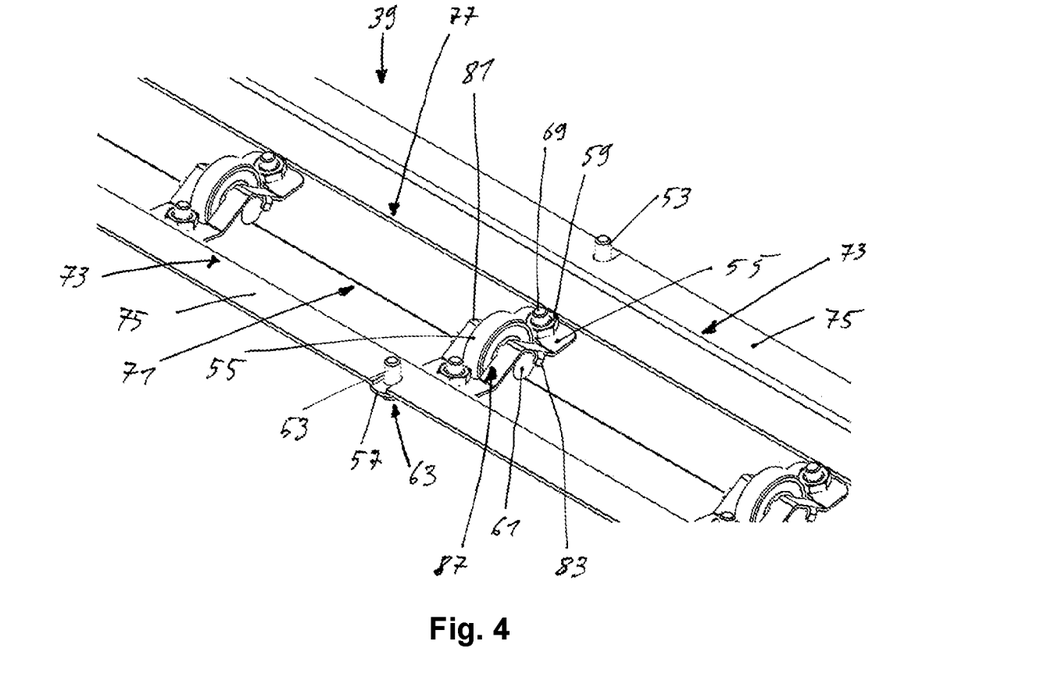
FIG. 4 is a view of a portion of the belt-guiding device, looking at the side opposite the conveying belt.

FIG. 4 shows a portion of belt-guiding device 51. Rolling-element bearings 55 are mounted to cross member 39 by means of retaining elements 65. This view shows the side of belt-guiding device 51 that faces conveyor frame 15.

Figure 5:
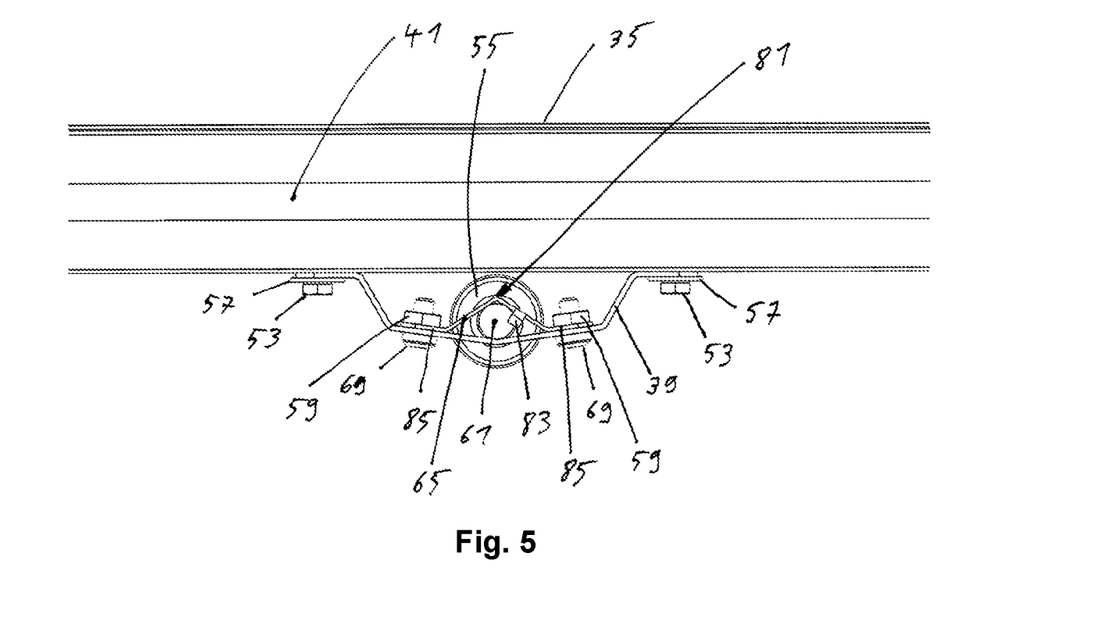
FIG. 5 is a side view showing the belt conveyor in the region of the belt-guiding device.

FIG. 5 is a side view showing the belt conveyor in the region of the belt-guiding device. FIG. 5 illustrates how cross member 39 is attached to the profile member with screws and washers 57 at the mounting holes of the mounting rails. Axle 61, on which the inner race of rolling-element bearing 55 is mounted, rests in the V-shape formed in cross member 39 by the central fold. Retaining element 65, which, as a result of a fold 81, forms a V-shape inverse to cross member 39, is attached at its mounting tabs 85 to cross member 39 by means of screws 69 and nuts 59. "Inverse" does not mean that the V-shape of cross member 39 and the V-shape of retaining element 65 have the same angle, but that they are oriented in opposite directions. Thus, cross member 39 and retaining element 65 form a space therebetween sufficient to accommodate axle 61.

In order to prevent axial displacement of axle 61, retaining element 65 includes a stop 83. A top panel 35, over which the conveying belt slides, is mounted on the side of the profile member 41 of conveyor frame 15 that is opposite to cross member 39. Rolling-element bearing 55 extends through the opening through cross member 39 and forms a support for the revolving conveying belt under cross member 39 on the side opposite the profile member 41. The revolving conveying belt is supported by a portion of the outer surface of rolling-element bearing 55.

Figure 6:
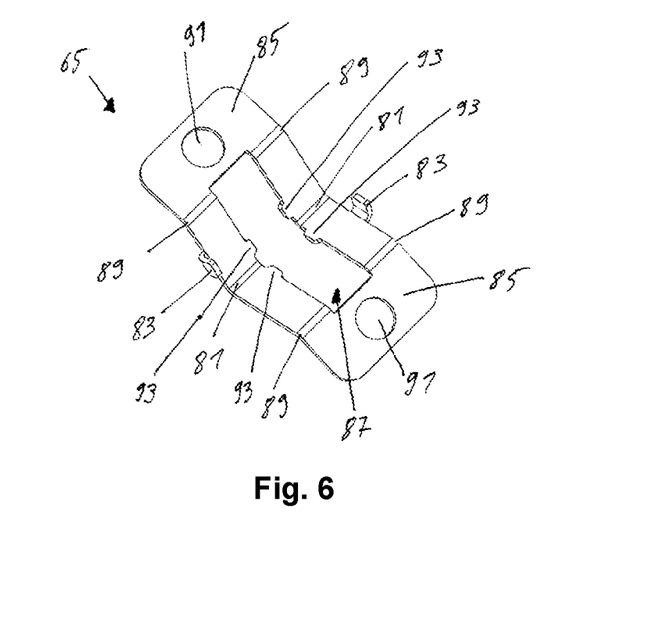
FIG. 6 is a view showing a retaining element for mounting a rolling-element bearing on a cross member of the belt-guiding device.

FIG. 6 shows a retaining element 65 for mounting a rolling-element bearing on a cross member of the belt-guiding device. Retaining element 65 is a bent sheet-metal part which forms a V-shape by means of a central fold 81. A further fold 89 near each of the ends forms a respective mounting tab 85. Mounting tabs 85 extend parallel to the V-shape of the cross member to which retaining element 65 is screwed. Mounting tabs 85 have a bore to allow retaining element 65 to be screwed to the cross member.

Once retaining element 65 and the cross member are screwed together, the V-shape of retaining element 65 and the V-shape of the cross member form a cavity in which an axle carrying a rolling-element bearing can be received. Since the V-shape of cross member 39 and the V-shape of retaining element 65 may have different angles, the cavity may not have a rectangular cross section. In order to prevent any pronounced displacement of the axle in the axial direction, a stop 83 is provided at either side of the retaining element. The distance between the two stops 83 is slightly greater than the length of the axle, so that the axles have some axial play. The retaining element includes an opening 87 through which extends the rolling-element bearing which is mounted on an axle.

Guide nubs 93, which are disposed at the height of the inner race of the rolling-element bearing, protrude into opening 87 from both sides and are in contact with the inner races of the rolling-element bearings. This prevents the rolling-element bearing from being displaced within the opening along the axle.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A belt conveyor for conveying discrete articles, the belt conveyor comprising:
   a conveyor frame having a top side, a bottom side, and a length extending in a conveying direction of the discrete articles;
   a conveying belt configured to revolve around the conveyor frame during operation of the belt conveyor; and
   a belt-guide mounted to the bottom side of the conveyor frame between the conveyor frame and the conveying belt,
   wherein the belt-guide comprises at least two rolling-element bearings, inner races of the rolling-element bearings being respectively mounted on axles, and the axles being disposed parallel to each other and stationary relative to the conveyor frame, and the outer races of the rolling-element bearings having direct contact with the conveying belt,
   wherein the belt-guide comprises a cross member, which is mounted to the bottom side of the conveyor frame, and which extends transversely to the conveying direction over a substantial portion or an entire width of the conveyor frame, and wherein the cross member comprises folds in regions which are configured to receive the rolling-element bearings, the fold extending along a length of the cross member transversely to the conveying direction between the regions which are configured to receive the rolling-element bearings.

2. The belt conveyor as recited in claim 1, wherein the rolling-element bearings are mounted with retaining elements on the cross member of the belt-guide.

3. The belt conveyor as recited in claim 1, wherein the cross member comprises a continuous fold which extends over the entire length of the cross member to form regions which are configured to receive the rolling-element bearings.

4. The belt conveyor as recited in claim 1, wherein the axles on which the inner races of the rolling-element bearings are mounted are held by retaining elements in a V-shape of the cross member, which V-shape is formed by the folds.

5. The belt conveyor as recited in claim 4, wherein the retaining elements each include two stops which limit the position of an axle, of the axles, in its axial direction.

6. The belt conveyor as recited in claim 1, wherein the cross member has a shape of a channel having a V-shape centrally along its axis, the internal angle being an obtuse angle.

7. The belt conveyor as recited in claim 6, wherein lateral ends of the channel-shaped cross member have further folds and mounting holes, the cross member being screwed to the conveyor frame at the mounting holes.

8. The belt conveyor as recited in claim 1, wherein the rolling-element bearings are ball bearings or roller bearings.

9. The belt conveyor as recited in claim 1, wherein the cross member is formed of a folded metal plate, the axles on which the rolling-element bearings are mounted being mounted on the cross member on a side facing the conveyor frame, and the cross member has openings through which the rolling-element bearings extend partially through the cross member, and wherein the conveying belt at least partially contacts a portion of the rolling-element bearings that extends through the opening of the cross member.

10. The belt conveyor as recited in claim 2, wherein each of the retaining elements is formed of a V-shaped metal plate which is folded at its ends and which has an opening through which the rolling-element bearings partially extend.

11. The belt conveyor as recited in claim 10, wherein the retaining elements are connected to the cross member, and the openings for the rolling-element bearings in the cross member and the openings for the rolling-element bearings in the retaining elements are aligned with one another, and cavities are formed between the cross member and the retaining elements, the cavities forming receptacles for the axles on which the rolling-element bearings are mounted.

12. The belt conveyor as recited in claim 10, wherein guide nubs, which are disposed at a height of the inner race of the respective rolling-element bearings, protrude from both sides into the opening of the retaining element.

13. A belt conveyor scale comprising a scale unit comprising at least one load cell; and the belt conveyor according to claim 1, which is placed on the scale unit.

14. The belt conveyor as recited in claim 1, wherein the cross member is mounted at least substantially centrally to the bottom side of the conveyor frame and extends perpendicularly to the conveying direction over the substantial portion or the entire width of the conveyor frame.

15. The belt conveyor as recited in claim 6, wherein the internal angle is an angle between 135° and 170° or between 150° and 170°.

16. The belt conveyor according to claim 1, wherein as a result of the folds, a channel extends across the cross member transversely to the conveying direction, and the two rolling-element bearings are each mounted within the channel.

17. A belt conveyor for conveying discrete articles, the belt conveyor comprising:

a conveyor frame having a top side, a bottom side, and a length extending in a conveying direction of the discrete articles;

a conveying belt configured to revolve around the conveyor frame during operation of the belt conveyor; and a belt-guide mounted to the bottom side of the conveyor frame between the conveyor frame and the conveying belt, wherein the belt-guide comprises at least two rolling-element bearings, inner races of the rolling-element bearings being respectively mounted on axles, and the axles being disposed parallel to each other and stationary relative to the conveyor frame, and the outer races of the rolling-element bearings having direct contact with the conveying belt, wherein the belt-guide comprises a cross member, which is mounted to the bottom side of the conveyor frame, and which extends transversely to the conveying direction over a substantial portion or an entire width of the conveyor frame, wherein the rolling-element bearings are mounted with retaining elements on the cross member of the belt-guide, wherein each of the retaining elements is formed of a V-shaped metal plate which is folded at its ends and which has an opening through which the rolling-element bearings partially extend, and wherein the retaining elements are connected to the cross member, and the openings for the rolling-element bearings in the cross member and the openings for the rolling-element bearings in the retaining elements are aligned with one another, and cavities are formed between the cross member and the retaining elements, the cavities forming receptacles for the axles on which the rolling-element bearings are mounted.

18. A belt conveyor for conveying discrete articles, the belt conveyor comprising:

a conveyor frame having a top side, a bottom side, and a length extending in a conveying direction of the discrete articles;

a conveying belt configured to revolve around the conveyor frame during operation of the belt conveyor; and a belt-guide mounted to the bottom side of the conveyor frame between the conveyor frame and the conveying belt, wherein the belt-guide comprises at least two rolling-element bearings, inner races of the rolling-element bearings being respectively mounted on axles, and the axles being disposed parallel to each other and stationary relative to the conveyor frame, and the outer races of the rolling-element bearings having direct contact with the conveying belt, wherein the belt-guide comprises a cross member, which is mounted to the bottom side of the conveyor frame, and which extends transversely to the conveying direction over a substantial portion or an entire width of the conveyor frame, wherein the rolling-element bearings are mounted with retaining elements on the cross member of the belt-guide, wherein each of the retaining elements is formed of a V-shaped metal plate which is folded at its ends and which has an opening through which the rolling-element bearings partially extend, and wherein guide nubs, which are disposed at a height of the inner race of the respective rolling-element bearings, protrude from both sides into the opening of the retaining element.

\* \* \* \* \*